(No Model.)

J. P. BEARD.
CHURN.

No. 326,936. Patented Sept. 29, 1885.

WITNESSES
F. L. Ousand
G. B. Harris

INVENTOR
J. P. Beard
by Bet Chiswell
Attorneys

UNITED STATES PATENT OFFICE.

JAMES P. BEARD, OF GADSDEN, ALABAMA.

CHURN.

SPECIFICATION forming part of Letters Patent No. 326,936, dated September 29, 1885.

Application filed February 29, 1884. (No model.)

*To all whom it may concern:*

Be it known that I, J. P. BEARD, a citizen of the United States, residing at Gadsden, in the county of Etowah and State of Alabama, have invented a new and useful Churn, of which the following is a specification, reference being had to the accompanying drawings.

My invention relates to churns; and the novelty consists in the construction, arrangement, and adaptation of parts, as will be more fully hereinafter set forth, and specifically pointed out in the claims.

The richest portions of milk are lightest in gravity and seek the top of the body. My invention seeks to give to this portion the most violent agitation, but to apply this agitation beneath the surface by providing counter eddies. It also provides that these eddies shall cover such an area at the top that the dashing milk will be impelled away from the journals of the dasher-shaft.

Figure 1:
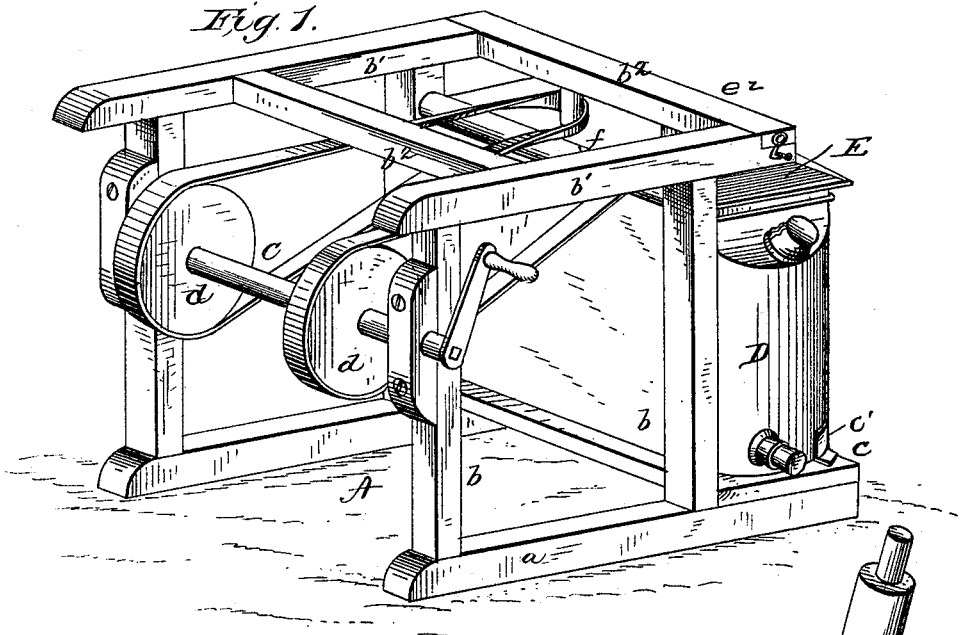
Figure 2:
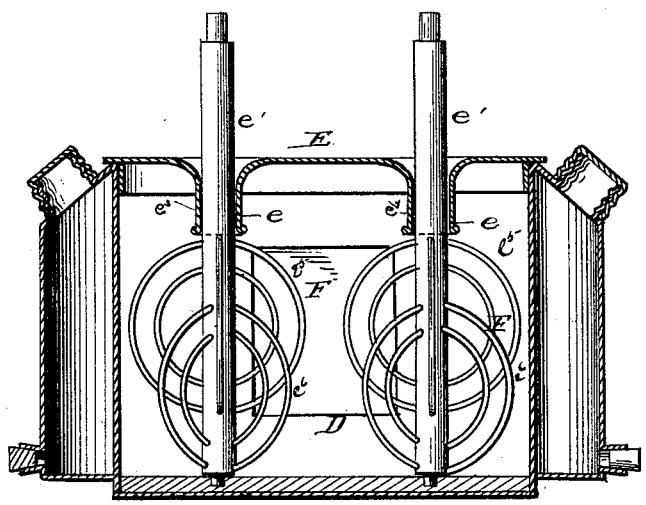
Figure 3:
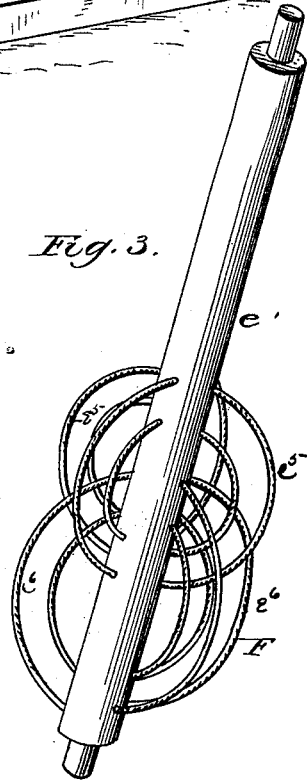

The invention is illustrated in the accompanying drawings, in which Figure 1 is a perspective view of one of my churns; Fig. 2, a vertical section, and Fig. 3 a detail view of the dasher.

Referring to the drawings, A designates the main frame, upon the base $c$ of which is secured by bracket $c'$ the churn-body or milk-receptacle D. This receptacle D has a close-fitting cover, E, of sheet metal, and this cover, E, by spinning or otherwise, is formed with two socket-bearings, $e$, the upper portions of which comprise cups or depressions $e^4$, to hold any milk that may be forced up through the journals $e'$, and allow it to gravitate therefrom as soon as possible without running over the face of the cover. The sockets $e$ receive and furnish bearings for the shafts $e'$ of the dasher, and are, preferably, two in number, located at a sufficient distance apart and from the ends of the receptacle to allow the milk to be agitated into two eddies revolving in the same direction.

The cover thus formed is easily and cheaply made, and forms an important feature of the invention by reason of its relation to the peculiar dasher to be described.

The dashers $e'$ are formed with arms E of bent wire or rods, forming loops, both ends of which are secured in the dasher-shaft. They surround the dasher in two series, the upper series, $e^5$, extending farther outward, and the lower series, $e^6$, interlocking therewith to form a greater number of arms at the center.

The upper ends of the dashers are journaled in the cross-bar $e^2$ of the main frame, and they are both revolved in the same direction by belt-connections $c$ $d$, from a common shaft.

The centrifugal motion derived from the dashers forms two eddies in the receptacle D, which serve to lower the surface of the milk around the dasher-shafts $e'$ away from the journal sockets $e$, and to pile the milk up in the ends and middle of the receptacle. In the latter portion the eddies meet. This centrifugal force serves to a degree to throw the heavier portions of the milk outward and induce the richer portions to a lower level to receive the beating of the arms. The heavier portions dashing from the ends and center force the rich milk away from the concave of the eddies, from whence it arises to the surface again to seek the centers of the eddies and receive the action of the multiplied arms.

Any milk that may be forced through the journals $e'$ is held by the cups $e^4$, until the force is spent, and it is allowed to gravitate again to the receptacle.

The important features of this invention rests in the construction and arrangement of the dashers in their relation to the peculiar cover and the milk receptacle, as shown. The longer arms being uppermost serve to induce the eddies mentioned, and the multiplicity of arms at the center serve to afford the greatest agitation below the surface and distant from the shaft-journals $e$.

I am aware that churn-dashers have been made with bent metal or other rods; but I am not aware that such loops have been made of different sizes for the purposes described, or that different sized loops have been arranged to interlock.

I am aware that depending sockets have been made in churn-covers, but not that such sockets have been formed with retaining-cups, as $e^4$, to serve with a dasher as described.

What I claim as new is—

1. In a churn, substantially as described, a churn-dasher consisting of a shaft, $e'$, and bent loops $e^5$ $e^6$, the loops $e^5$ being larger than the loops $e^6$, and the latter interlocking with the former, as and for the purpose set forth.

2. In a churn, as described, the combination, with the receptacle D, having seats for two dashers, the cover E, having depending dasher-sockets $e$, with cups $e^4$, and the dashers having looped arms $e^5$ and $e^6$, interlocking with each other, and the former of greater dimensions than the latter, and adapted to excite an eddy, as described, the whole arranged as and for the purposes set forth.

In testimony that I claim the foregoing as my own I have hereto affixed my signature in the presence of two witnesses.

JAMES P. ✗ BEARD.
his mark.

Witnesses:
J. H. JONES,
JO. S. DAY.